United States Patent Office.

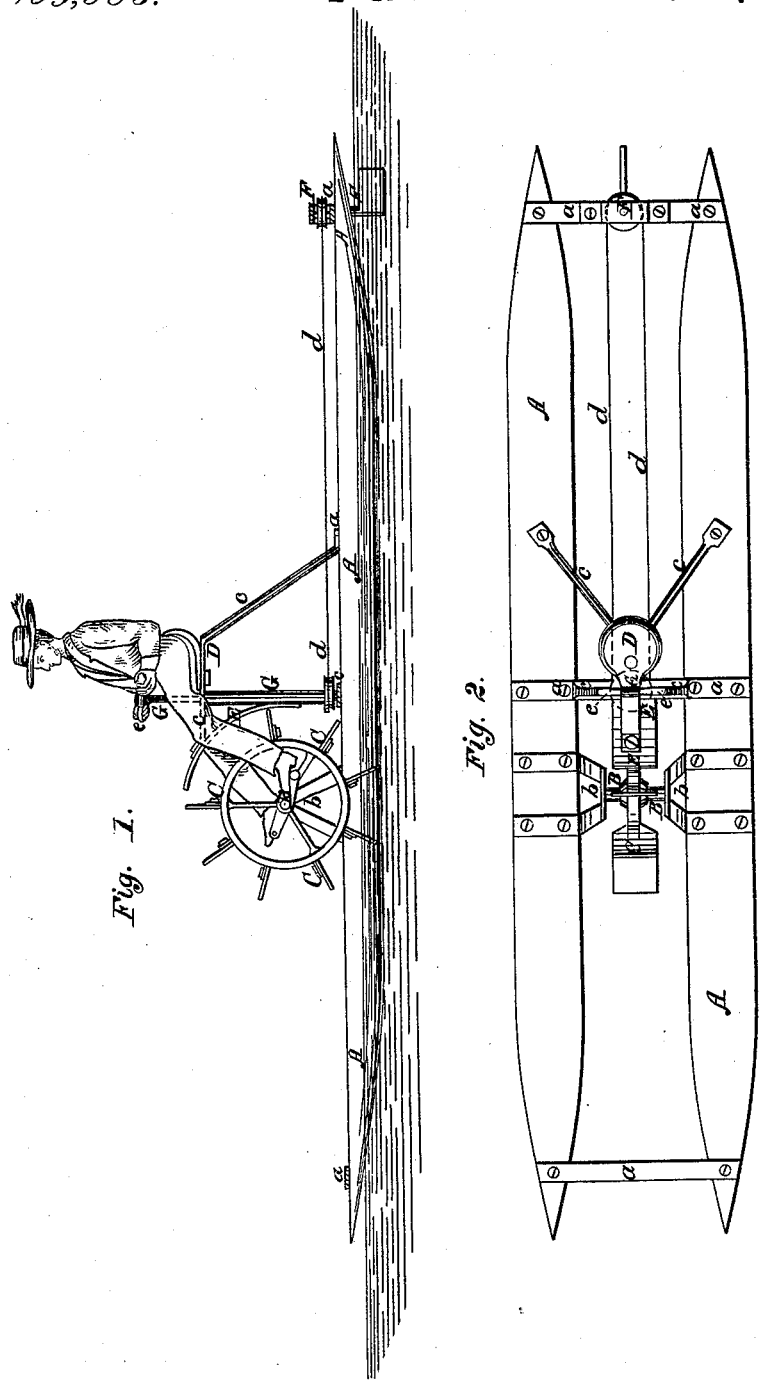

CARL O. WEDERKINCH AND ARCHIBALD STARKWEATHER, OF BOSTON, MASSACHUSETTS.

Letters Patent No. 109,083, dated November 8, 1870.

IMPROVEMENT IN FLOATING VELOCIPEDES.

The Schedule referred to in these Letters Patent and making part of the same.

*To all whom it may concern:*

Be it known that we, CARL O. WEDERKINCH and ARCHIBALD STARKWEATHER, of the city of Boston, in the county of Suffolk and State of Massachusetts, have invented a new and improved Floating Velocipede; and we do hereby declare that the following is a full, clear, and exact description thereof, which will enable others skilled in the art to make and use the same, reference being had to the accompanying drawing forming part of this specification, in which—

Figure 1 represents a side elevation, partly in section, of our improved floating velocipede.

Figure 2 is a plan or top view of the same.

Similar letters of reference indicate corresponding parts.

This invention relates to a new floating velocipede, which can be conveniently operated and readily propelled, and consists in such construction and combination of a frame, double floats, steering apparatus, and paddle-wheel, that the rider straddles the paddle-wheel in operating the crank-axle of the same.

A A in the drawing are two floats, made of wood or other suitable material, arranged parallel to each other, at a suitable distance apart. They are connected by transverse bars $a\ a$, which constitute, with the floats, a rigid frame.

Upon each float is secured a box, $b$, to sustain the driving crank-shaft B, as shown, said shaft carrying a paddle-wheel, C, midway between the floats.

The driver's seat D is arranged behind the paddle-wheel, on braces $c$ that project from the floats, so that the rider may have his feet on the cranks of the shaft B, straddling the paddle-wheel, as shown.

A fender, E, in form of a curved plate, is interposed between the paddle-wheel and the seat, to protect the rider from the water thrown off by the wheel.

The rudder-post F is, by an endless band $d$, or by two rods or chains, or otherwise, connected with the steering-post G, which is supported by the braces $c$ in front of the seat, and which has a convenient steering-handle, $e$, at its upper end.

This velocipede, although of simple construction, will be operated without difficulty, and can be propelled with great rapidity.

Having thus described our invention,

What we claim as new, and desire to secure by Letters Patent, is—

1. A water-velocipede, provided with two parallel floats fastened together, a paddle-wheel operated by foot-cranks between them, and a seat for the driver, all constructed and arranged as shown and described.

2. A water-velocipede, provided with a steering apparatus, consisting of posts F G, endless band $d$, and pulleys, as specified.

3. The arrangement of the seat with respect to the paddle-wheel, as set forth.

CARL O. WEDERKINCH.
ARCHIBALD STARKWEATHER.

Witnesses:
G. W. ARMSTRONG,
W. H. KING.